United States Patent [19]

Ebert

[11] Patent Number: 4,738,475
[45] Date of Patent: Apr. 19, 1988

[54] HOSE CLAMP

[75] Inventor: Karl Ebert, Giengen/Brenz, Fed. Rep. of Germany

[73] Assignee: Max Widenmann Armaturenfabrik, Fed. Rep. of Germany

[21] Appl. No.: 907,091

[22] Filed: Sep. 15, 1986

[30] Foreign Application Priority Data

Aug. 12, 1986 [DE] Fed. Rep. of Germany ....... 3627274

[51] Int. Cl.$^4$ ............................................. F16L 33/10
[52] U.S. Cl. .................................... 285/174; 285/243; 285/253
[58] Field of Search ............... 285/253, 243, 252, 259, 285/174

[56] References Cited

U.S. PATENT DOCUMENTS

| 489,107 | 1/1893 | Storz . | |
|---|---|---|---|
| 1,300,956 | 4/1919 | Greve | 285/253 |
| 2,963,305 | 12/1960 | Miller | 285/253 X |
| 4,139,224 | 2/1979 | Leach | 285/253 |
| 4,486,036 | 12/1984 | Storke et al. | 285/253 |
| 4,564,222 | 1/1986 | Loker et al. | 285/243 |
| 4,593,942 | 6/1986 | Loker | 285/253 |

FOREIGN PATENT DOCUMENTS 461199 10/1968 Switzerland ....................... 285/243
631086 10/1949 United Kingdom ................ 285/253

Primary Examiner—Thomas F. Callaghan
Attorney, Agent, or Firm—Gerald J. Ferguson, Jr.; Michael P. Hoffman; Michael J. Foycik, Jr.

[57] ABSTRACT

The hose clamp for fire hoses on hose couplings comprises a nipple whereon the hose end is pushed. The hose end is pressed on the nipple via a radially resiliently compressible clamping sleeve by means of a clamping element against the outer surface of the nipple. The clamping sleeve comprises a conical outer face and the clamping element a conical inner face cooperating therewith. The clamping element consists of two generally semicylindrical clamping shells which are braced against each other at their peripheral ends by clamping screws which extend approximately tangentially through the wall thickness of the clamping shells. The nipple comprises an encircling annular collar which forms a radial abutment face for the hose end and the clamping sleeve. The conical inner face of each clamping shell adjoins at the end of its large diameter a radially inwardly directed collar which lies axially outside the region of the clamping zone and which engages behind the annular collar of the nipple and through the enlarged wall thickness of which at least one of the clamping screws extends.

8 Claims, 2 Drawing Sheets

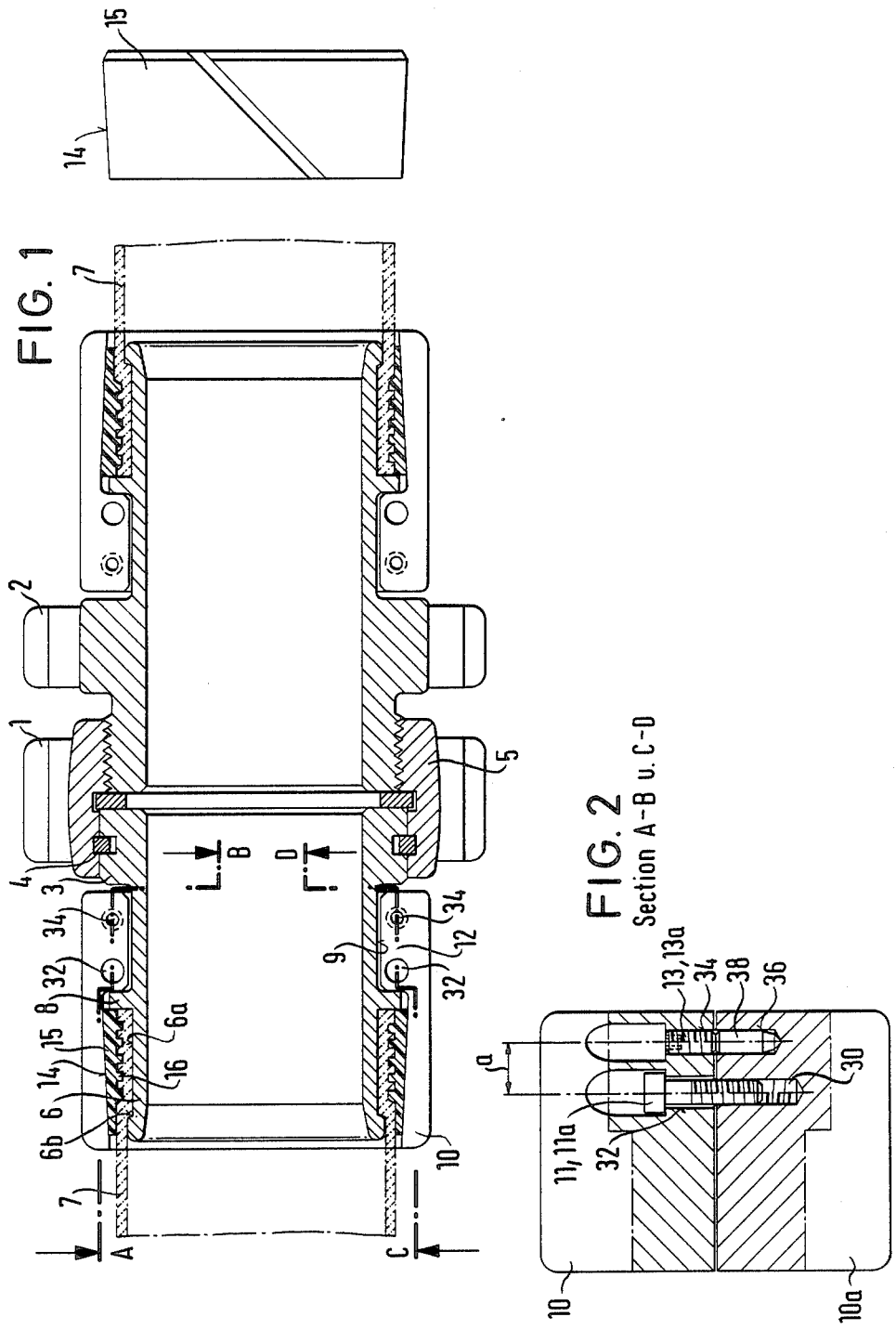

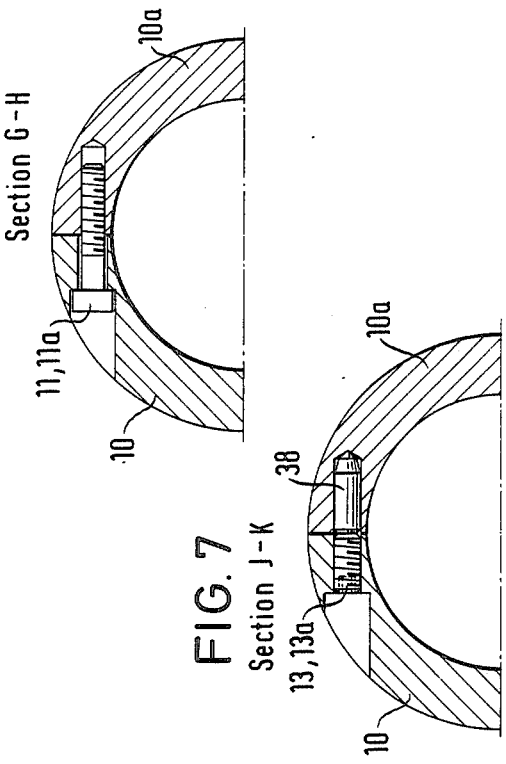
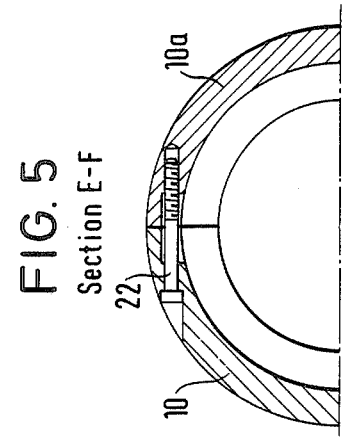
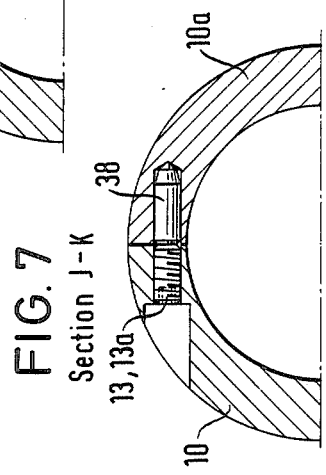
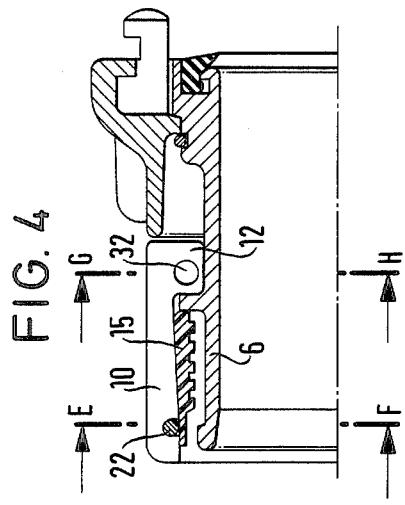
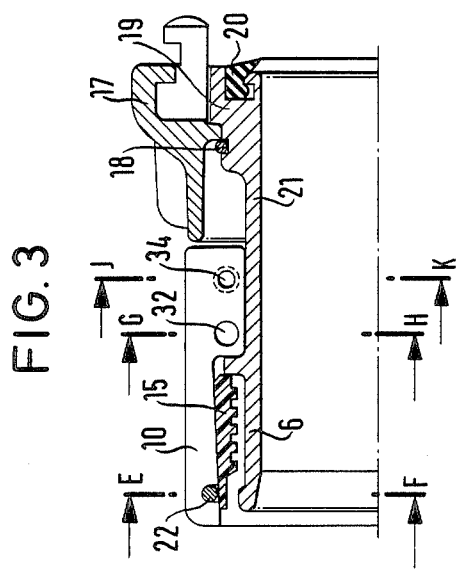

HOSE CLAMP

BACKGROUND OF INVENTION

This invention relates to a hose clamp, in particular to a hose clamp for fire hoses on hose couplings. In hose clamps of this kind the hose end pushed onto an axially extending nipple is pressed via a radially resiliently compressible clamping sleeve by means of a clamping element against the outer surface of the nipple. The clamping sleeve has a conical outer surface and the clamping element has a conical inner surface cooperating with the outer surface.

Such a hose clamp is known from German utility model No. 7,509,675. In this hose clamp the clamping element consists of a clamping ring which is tightened by axial clamping screws against a flange. Since the clamping screws are disposed at the outer periphery of the clamping ring the result is a large outer diameter of the hose clamp which can obstruct the handling of a fire hose by the hose clamp getting stuck on obstructions. In another type of hose clamp disclosed in U.S. Pat. No. 4,139,224, the hose end is clamped on the nipple without interposition of a clamping sleeve and by a clamping ring which is divided diametrically into two clamping shells which are radially braced against each other by clamping screws. These clamping screws must however be given relatively large dimensions to ensure that the clamping ring is secured both in the radial direction and in the axial direction on the clamp connecting piece. The clamping ring formed from the two clamping shells, for accommodation of the clamping screws, must therefore have a relatively large outer diameter and this makes the clamp bulky and makes handling the hose more difficult, due particularly to it becoming caught on obstacles.

OBJECTS OF THE INVENTION

A primary object of the invention is to provide an improved hose clamp permitting easy handling of a fire hose equipped with one or more of such hose clamps.

A further object of the invention is to provide an improved hose clamp the outer periphery of which can be made cylindrical and in diameter almost of the same size as the neck diameter of the hose coupling so that the hose with the hose coupling during handling has less tendency to get stuck on projecting parapets, edges, walls or the like.

SUMMARY OF THE INVENTION

The hose clamp of the present invention has an axially extending nipple adapted to receive an end of a hose, a radially resiliently compressible clamping sleeve at least partially surrounding the hose end pushed onto the outer surface of the nipple and a pair of generally semicylindrical clamping shells. The clamping shells surround the clamping sleeve and are braced against each other and against said clamping sleeve by clamping screws extending at least approximately tangentially through the wall thickness of the clamping shells at the peripheral ends thereof. The clamping sleeve has a conical outer surface and said clamping shells define a conical inner surface adapted to cooperate with the outer surface of the clamping sleeve. The nipple has an encircling annular collar forming a radial abutment face for the hose end and for the clamping sleeve. The clamping shells define a radially inwardly directed collar on their end adjacent to the large diameter base of their conical inner surface. The radially inwardly directed collar engages behind the annular collar of the nipple on its axial side opposite to that forming the radial abutment face thereof, and the radially inwardly directed collar has an increased wall thickness wherethrough the clamping screws extend.

The invention utilizes the fact that near the end of the conical inner face of the clamping element which has the larger diameter an increased wall thickness is available without enlarging the outer diameter for accommodating the clamping screw which passes approximately tangentially through the wall thickness. Instead of a continuous clamping ring which must be clamped in the axial direction against a flange or the like a clamping element divided into two clamping shells can therefore be used. The clamping shells braced against each other by the clamping screws combine to form a clamping ring with smooth cylindrical outer surface whose outer diameter can be appreciably smaller than the outer diameter of the hose coupling members. This provides apart from a reduced outer diameter also a saving of material and weight.

In the hose clamp according to the invention the clamping screws are only subjected to a radial stress because the axial securing is effected by the inwardly projecting radial collar of the clamping shells engaging behind the annular collar of the nipple and being secured by the latter in the axial direction. The clamping screws can therefore be made with relatively small dimensions so that the wall thickness of the clamping shells can be made correspondingly small. A further particular feature of the hose clamp according to the invention resides however in that the clamping screws are disposed in the radially inwardly directed collar which is located in the axial direction outside the hose clamp zone. In this region there is a greater radial height available for the wall thickness of the collar so that relatively thick clamping screws can be accommodated within the wall thickness without having to increase the overall outer diameter of the hose clamp.

In the assembly of the hose clamp according to the invention the two clamping shells are only moved inwardly in the radial direction by tightening of the clamping screws whilst in the hose clamp known from German utility model No. 7,509,675 an axial movement of the clamp ring occurs. In the hose clamp according to the invention simplification of the clamping sleeve is therefore possible in that it is not slit in V shape but simply diagonally.

According to a first embodiment of the invention only one pair of clamping screws is provided which are disposed at the axial end of the clamping shells which corresponds to the smaller diameter of the conical inner face. According to a second embodiment two pairs of clamping screws are provided of which the second additional pair is disposed in the radially inwardly directed collar. The clamping screws therefore act on both axial ends of the clamping shells. Since in the region of the radially inwardly directed collar of the clamping shells a greater wall thickness is available than at the opposite axial end, in advantageous manner clamping screws are used there with a greater diameter than at the other opposite axial end.

According to a further development of the two embodiments of the invention the radially inwardly directed collar is extended in the axial direction and at one of the two clamping shells at the axial end of said collar forming the corresponding end of the clamping shell a pair of pressure screws is arranged parallel to the clamping screws and axially spaced therefrom and bear with the end face of their inner end in each case on a counter face of the other clamping shell. By this combination of clamping screws with these adjacent pressure screws on tightening the clamping screws a bending moment is generated such that the clamping shells are moved inwardly in radial direction at their end facing the hose. The clamping screws also prevent a mouth-like opening of the two clamping shells at their end facing the hose.

The hose clamp according to the invention is particularly suitable for all common types of hose couplings, in particular threaded couplings and Storz couplings.

A particular advantage of the invention resides in that by the encircling annular collar of the clamp connecting piece which prevents an axial movement of the two clamping shells, on increasing water pressure and with joint axial movement of the hose end and clamping sleeve by cooperation of the two conical faces the hose end is additionally and automatically pressed onto the outer surface of the nipple. A high pressure resistance is therefore achieved particularly when in accordance with a further advantageous embodiment the outer surface of the nipple is made cylindrical throughout in contrast to the conventional construction with encircling ribs, which make production more difficult and more expensive. The continuous smooth form of the nipple improves the sealing properties in so far as on the inner face of the clamping sleeve a large number of relatively fine encircling ribs or teeth can be disposed and this increases the length of the leakage paths.

With hose clamps according to the invention hoses of different wall thicknesses can be used. With small hose wall thickness thin-walled strips of plastic or metal can be placed in the two clamping shells; such strips are not necessary with larger hose wall thicknesses. Further advantages and features of the invention will become apparent from the following description of preferred embodiments by reference to the drawings.

BRIEF DESCRIPTION OF THE DRAWINGS

FIG. 1 is an axial section through a first embodiment with threaded coupling;

FIG. 2 is a partial section of the hose clamp of FIG. 1 along the lines A-B and C-D of FIG. 1;

FIG. 3 is a partial axial section of a second embodiment with dog ring coupling of Storz type;

FIG. 4 is a partial axial section of a third embodiment with dog ring coupling and FIG. 5, 6 and 7 are partial sections of the embodiments of FIGS. 3 and 4.

DETAILED DESCRIPTION OF PREFERRED EMBODIMENTS

In FIG. 1 there is a hose clamp on each part of the complete hose coupling consisting of female part 1 and male part 2. The female part 1 comprises a tubular section 3 which is connected by means of a spring ring 4 rotatably to a cap nut 5. The tubular section 3 is connected to an axially extending nipple 6 for a hose 7. The nipple 6 comprises a radially outwardly directed annular collar 8 which defines a cylindrical turned-down portion 9 of the nipple 6. A clamping ring is formed by two clamping shells 10, 10a which form a radially inwardly directed collar 12 at their one axial end, said collar being accommodated in the turned-down portion 9. The annular collar 8 forms a radial shoulder on which the collar 12 bears in the axial direction. The clamping shells 10, 10a are connected together by two clamping screws 11, 11a which are led approximately in the tangential region through the wall thickness of the two peripheral ends of the clamping shells 10, 10a and inserted into corresponding bores of said clamping shells, of which the bores of the clamping shell 10a designated by 30 have an internal thread whilst the bores of the clamping shell 10 designated by 32 have a larger internal diameter than the external diameter of the clamping screws 11, 11a and are provided with a step for engagement of the screw head.

At a slight axial distance a from the clamping screws 11, 11a and parallel thereto, at the axial end, facing the coupling parts, of the collar 12 extended in the axial direction two bores 34 are disposed with internal thread and a pressure screw 13, 13a is screwed into each of said bores. A bore 36 in the clamping shell 10a aligns with each of the bores 34 of the clamping shell 10. Into said bore 36 a cylindrical bolt 38 of steel is inserted. The pressure screws 13, 13a each bear with the end face of their inner end on a counter face which is formed by the end face of the bolt 38 facing them. The use of the steel bolt 38 is expedient when for making the clamping shells 10, 10a a relatively soft material such as aluminium is used which can easily be machined and has a low weight.

The nipple piece 6 comprises a smooth continuous cylindrical outer surface 6a which is defined in the axial region between the annular collar 8 and a shoulder 6b at the front end, facing the hose 7, of the nipple 6. Onto the outer surface 6a of the nipple 6 the end of the hose 7 is pushed. This hose end is surrounded by a clamping sleeve 15 which is slit in the diagonal direction at an angle of 45° to the axis. The clamping sleeve 15 comprises a conical outer surface 14 which corresponds to the conical inner surface of the clamping shells 10, 10a which extends between the collar 12 and the front end of the clamping shells facing the hose 7 where the smaller diameter of the conical face is disposed. The clamping sleeve 15 has on its inner side grooves 16 which have a rectangular cross-section and in the clamped state press into the hose wall.

In the embodiment of the hose clamp shown in FIG. 3 said clamp is disposed on a dog ring coupling of the Storz type. In this hose coupling a dog member 17 is connected by means of a spring ring 18 rotatably to the sealing ring 20, disposed at the end face 19, of the tube connecting piece 21 to which the nipple 6 is connected. This embodiment is intended for large-volume hoses and/or particularly high test pressures of more than 30 bar. In this embodiment the clamping shells 10, 10a are additionally held by two clamping screws 22 which are arranged similarly to the clamping screws 11, 11a but at the front end of the clamping shells facing the hose. Otherwise, this embodiment corresponds to that of FIGS. 1 and 2.

In the embodiment of FIG. 1 for clamping the hose 7 the end thereof is pushed onto the nipple 6 up to the radial shoulder of the annular collar 8. Thereafter the clamping sleeve 15 with its thickened end pointing towards the radial shoulder of the annular collar 8 is placed on the outer surface of the hose 7. After in the one clamping shell 10 the two pressure screws 13, 13a have been screwed out with a slight projection of for example 2 mm from their bores 34 the two clamping shells 10, 10a are placed in position and connected together by the two clamping screws 11, 11a. When this is done the clamping shells 10, 10a move radially towards each other. Thereafter the pressure screws 13, 13a are turned back, whereupon the two clamping screws 11, 11a are further tightened. By further turning out of the pressure screws 13, 13a an additional moment is then generated which closes the clamping shells and subjects the clamping screws 11, 11a to tensile stress, the division planes of the two clamping shells 10, 10a lying parallel to each other or coming to bear on each other, depending on the wall thickness of the hose. The axial spacing a between the clamping screws 11, 11a on the one hand and the pressure screws 13, 13a on the other hand governs the magnitude of the moment which acts in the closing direction for a given adjustment force of the pressure screws 13, 13a at the front end of the clamping shells 10, 10a facing the hose.

In the simplified embodiment of FIG. 4 the pressure screws 13, 13a of the previously described embodiments are omitted and the collar 12 of the clamping shells 10, 10a has a correspondingly smaller axial length. However, in this embodiment as well corresponding to the embodiment of FIG. 3 an additional clamping screw 22 is provided in each case at the front end of the clamping shells 10, 10a.

I claim:

1. A hose clamp comprising:
   an axially extending nipple adapted to receive an end of a hose, said nipple having an outer surface,
   a radially resiliently compressible clamping sleeve at least partially surrounding said hose end when said hose end is disposed snugly about the outer surface of said nipple,
   and a pair of generally semicylindrical clamping shells;
   said clamping shells surrounding said clamping sleeve and are braced against each other and against said clamping sleeve by clamping screws extending at least approximately tangentially through the wall thickness of the clamping shells at the peripheral ends thereof, said clamping sleeve having a generally conical outer surface, said clamping shells together having a conical inner surface adapted to cooperate with said outer surface fo said sleeve, said nipple having an encircling annular collar forming a radial abutment face for abutting with said hose end and for abutting with said clamping sleeve, said clamping shells each including a radially inwardly directed semicylindrical collor on one end adjacent to a larger diameter base of said conical inner surface, said radially inwardly directed collar engaging into an axially extending cylindrical recess located behind the annular collar of said nipple on its axial side opposite to that forming said radial abutment face, and said radially inwardly directed collar having a substantially axial extension accommodated in said axially extending cylindrical recess, and having an increased wall thickness wherethrough said clamping screws extend without projecting beyond the outer surface of said collar;
   wherein at least two pairs of clamping screws are provided, of which the first is disposed at the axial end of the clamping shells which corresponds to the smaller diameter of said conical inner face and the second is disposed in said radially inwardly directed collar.

2. The hose clamp according to claim 1, wherein the clamping sleeve is diagonally slit.

3. The hose clamp according to claim 1, wherein said clamping screws disposed in said radially inwardly directed collar have a greater diameter than the clamping screws of the first pair.

4. The hose clamp according to claim 1, wherein said nipple has a threaded end adapted to serve as a threaded hose coupling.

5. The hose clamp according to claim 1, wherein said nipple has an end provided with a hook ring coupling.

6. The hose coupling according to claim 1, wherein said nipple comprises a smooth cylindrical outer surface between said abutment face and its end facing the hose.

7. A hose clamp comprising an axially extending nipple adapted to receive an end of a hose, a radially resiliently compressible clamping sleeve at least partially surrounding said hose end pushed onto the outer surface of said nipple, and a pair of generally semicylindrical clamping shells, wherein:
   said clamping shells surround said clamping sleeve and are braced against each other and against said clamping sleeve by clamping screws extending at least approximately tangentially through the wall thickness of the clamping shells at the peripheral ends thereof, said clamping sleeve has a conical outer surface and said clamping shells define a conical inner surface adapted to cooperate with said outer surface, said nipple having an encircling annular collar forming a radial abutment face for said hose end and for said clamping sleeve, said clamping shells defining a radially inwardly directed collar on their end adjacent to the large diameter base of said conical inner surface, said radially inwardly directed collar engaging into an axially extending cylindrical recess located behind the annular collar of said nipple on its axial side opposite to that forming said radial abutment face, and said radially inwardly directed collar having a substantially axial extension accommodated in said axially extending cylindrical recess, and having an increased wall thickness wherethrough said clamping screws extend without projecting beyond the outer surface of said radially inwardly directed collar;
   said radially inwardly directed collar being extended in the axial direction and one of said two clamping shells having a pair of pressure screws at the axial end of said inwardly directed collar, said pressure screws being disposed parallel to the clamping screws and at an axial distance therefrom, and bearing with the end face of their inner ends on a counter face of the other clamping shell.

8. The hose clamp according to claim 7 wherein the clamping shells are formed from relatively soft material such as aluminium, said counter face being formed by the end face of a bolt or pin of hard material such as steel which is inserted into a bore of the respective clamping shell.

* * * * *